US012154513B2

(12) United States Patent
Lee et al.

(10) Patent No.: US 12,154,513 B2
(45) Date of Patent: Nov. 26, 2024

(54) DISPLAY DEVICE

(71) Applicant: Samsung Display Co., LTD., Yongin-si (KR)

(72) Inventors: Seung-Kyu Lee, Yongin-si (KR); Yongsik Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/307,925

(22) Filed: Apr. 27, 2023

(65) Prior Publication Data

US 2024/0087537 A1 Mar. 14, 2024

(30) Foreign Application Priority Data

Sep. 14, 2022 (KR) ........................ 10-2022-0115814

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0426* (2013.01); *G09G 2310/08* (2013.01)

(58) Field of Classification Search
CPC ............... G09G 3/3266; G09G 3/3258; G09G 2300/0426; G09G 2310/08; G09G 2300/0819; G09G 2300/0852; G09G 2300/0861; G09G 2310/0251; G09G 2310/0262; G09G 2320/043; G09G 3/035; G09G 3/3233; G09G 3/32; G09G 2300/0842; G09G 2330/02; G09G 2380/02; G09F 9/301; G09F 9/33; G09F 9/335; H10K 59/121; H10K 59/131
See application file for complete search history.

(56) References Cited

U.S. PATENT DOCUMENTS

2021/0249498 A1* 8/2021 Cho .................... H01L 27/1255
2022/0122522 A1* 4/2022 Li ........................ G09G 3/2092

FOREIGN PATENT DOCUMENTS

| | | |
|---|---|---|
| CN | 112150967 | 12/2020 |
| KR | 10-2015-0057661 | 5/2015 |
| KR | 10-2020-0121437 | 10/2020 |
| KR | 10-2245934 | 4/2021 |
| KR | 10-2022-0056162 | 5/2022 |

* cited by examiner

*Primary Examiner* — Abhishek Sarma
(74) *Attorney, Agent, or Firm* — KILE PARK REED & HOUTTEMAN PLLC

(57) ABSTRACT

A display device including a light emitting diode, a driving transistor, a second transistor, a third transistor, a fourth transistor, and a current blocking transistor. The current blocking transistor is a transistor of a different type from the driving transistor, and in case that a voltage of a gate electrode of the driving transistor is maintained at an initialization voltage, the current blocking transistor is turned off during a light emitting period to not transmit the light emitting current outputted by the driving transistor to an anode of the light emitting diode.

20 Claims, 15 Drawing Sheets

DISPLAY DEVICE

CROSS-REFERENCE TO RELATED APPLICATION(S)

This application claims priority to and benefits of Korean Patent Application No. 10-2022-0115814 under 35 U.S.C. § 119, filed in the Korean Intellectual Property Office on Sep. 14, 2022, the entire contents of which are incorporated herein by reference.

BACKGROUND

1. Technical Field

The disclosure relates to a display device.

2. Description of the Related Art

A display device such as an organic light emitting display device includes a display panel, and the display panel is manufactured by including several layers and elements on a substrate. Conventionally, glass has been used as a substrate of a display panel. However, since the glass substrate is rigid, it is difficult to bend or deform the display device. Recently, a flexible display device using a flexible substrate such as plastic, which is light and easily deformable, is being developed.

The flexible display device may be classified into a bendable display device, a foldable display device, a rollable display device, and the like according to its purpose or shape. Such a flexible display device may be bent or folded by using a flexible substrate such as plastic.

The above information disclosed in this Background section is only for enhancement of understanding of the background of the described technology, and therefore it may contain information that does not form the prior art that is already known in this country to a person of ordinary skill in the art.

SUMMARY

Embodiments provide a display device that prevents a light emitting diode from emitting light in case that cracks occur in some transistors.

Embodiments provide a display device that may include a light emitting diode including an anode and a cathode, a driving transistor including a gate electrode, a first electrode, and a second electrode outputting a light emitting current to the anode of the light emitting diode, a second transistor including a first electrode connected to a data line, a second electrode connected to the first electrode of the driving transistor, and a gate electrode, a third transistor including a first electrode connected to the second electrode of the driving transistor, a second electrode connected to the gate electrode of the driving transistor, and a gate electrode, a fourth transistor including a first electrode receiving an initialization voltage, a second electrode connected to the gate electrode of the driving transistor, and a gate electrode, and a current blocking transistor including a gate electrode, a first electrode, and a second electrode connected to the anode of the light emitting diode. The current blocking transistor may be a transistor of a different type from the driving transistor. In case that a voltage of the gate electrode of the driving transistor is maintained at the initialization voltage, the current blocking transistor may be turned off during a light emitting period to not transmit the light emitting current outputted by the driving transistor to the anode of the light emitting diode.

The display device may further include a gate voltage transmitting transistor including a first electrode connected to the gate electrode of the driving transistor, a second electrode connected to the gate electrode of the current blocking transistor, and a gate electrode.

The gate electrode of the gate voltage transmitting transistor may receive the same signal as the gate electrode of the third transistor.

The display device may further include a first capacitor including a first storage electrode to which a driving voltage is applied, and a second storage electrode connected to the gate electrode of the driving transistor, and a second capacitor including a first electrode to which the driving voltage is applied, and a second electrode connected to the gate electrode of the current blocking transistor.

The data voltage may be transmitted to the first storage electrode of the first capacitor through the driving transistor and the third transistor, and may be stored as a threshold voltage compensating data voltage in which a threshold voltage of the driving transistor is compensated, and the threshold voltage compensating data voltage may also be applied to and stored in the second electrode of the second capacitor through the gate voltage transmitting transistor.

In case that the second transistor or the third transistor does not operate, the initialization voltage may be stored in the second storage electrode of the first capacitor and the second electrode of the second capacitor.

The current blocking transistor may be turned off by the initialization voltage stored in the second electrode of the second capacitor, so that a current outputted by the driving transistor may not be transmitted to the anode of the light emitting diode.

The display device may further include a second capacitor charging transistor including a first electrode connected to the second electrode of the current blocking transistor, a second electrode connected to the gate electrode of the current blocking transistor, and a gate electrode.

In case that a voltage of the second electrode of the second capacitor is the threshold voltage compensating data voltage in the light emitting period, the second capacitor charging transistor may change a voltage of the second electrode of the second capacitor to the driving voltage.

The display device may further include a fifth transistor including a first electrode to which the driving voltage is applied, a second electrode connected to the first electrode of the driving transistor, and a gate electrode, and a sixth transistor including a first electrode connected to the second electrode of the driving transistor, a second electrode connected to the first electrode of the current blocking transistor, and a gate electrode.

The gate electrode of the fifth transistor, the gate electrode of the sixth transistor, and the gate electrode of the second capacitor charging transistor may receive a light emitting control signal having a low level voltage during the light emitting period.

The display device may further include a seventh transistor including a first electrode to which the initialization voltage is applied, a second electrode connected to the anode of the light emitting diode, and a gate electrode.

The driving transistor, the fifth transistor, the sixth transistor, and the second capacitor charging transistor may be p-type transistors, and the third transistor, the gate voltage transmitting transistor, and the current blocking transistor may be n-type transistors.

The display device may be a flexible display device.

Another embodiment provides a display device that may include a light emitting diode including an anode and a cathode, a first pixel circuit part including a driving transistor generating a light emitting current transmitted to the anode of the light emitting diode, and a second transistor transmitting a data voltage to the driving transistor, and a second pixel circuit part connected to the gate electrode of the driving transistor to transmit or block the light emitting current of the driving transistor to the anode of the light emitting diode according to a voltage of the gate electrode of the driving transistor.

The second pixel circuit part may include a current blocking transistor including a gate electrode, a first electrode, and a second electrode connected to the anode of the light emitting diode, the current blocking transistor may be a transistor of a different type from the driving transistor; and the current blocking transistor may transmit or block the light emitting current of the driving transistor to the anode according to a voltage of the gate electrode of the driving transistor.

The current blocking transistor, in case that the voltage of the gate electrode of the driving transistor is an initialization voltage, may be turned off to not transmit the light emitting current to the anode; and the current blocking transistor, in case that the voltage of the gate electrode of the driving transistor is a threshold voltage compensating data voltage in which a threshold voltage of the driving transistor is compensated from the data voltage, may be turned on to transmit the light emitting current to the anode.

The second pixel circuit part may further include a gate voltage transmitting transistor including a first electrode connected to a gate electrode of the driving transistor and a second electrode connected to a gate electrode of the current blocking transistor.

The second pixel circuit part may further include a second capacitor charging transistor including a first electrode connected to a second electrode of the current blocking transistor and a second electrode connected to the gate electrode of the current blocking transistor.

The first pixel circuit part may further include a first capacitor including a first storage electrode to which a driving voltage is applied, and a second storage electrode connected to the gate electrode of the driving transistor, and the second pixel circuit part may further include a second capacitor including a first electrode to which the driving voltage is applied, and a second electrode connected to the gate electrode of the current blocking transistor.

According to embodiments, in case that a second transistor or a third transistor does not operate because of a crack in a pixel, by including a blocking part (a second pixel circuit part) that prevents an output current of a driving transistor from being transmitted to a light emitting diode, it may be possible to prevent the light emitting diode from emitting light.

DETAILED DESCRIPTION OF THE EMBODIMENTS

Figure 1:
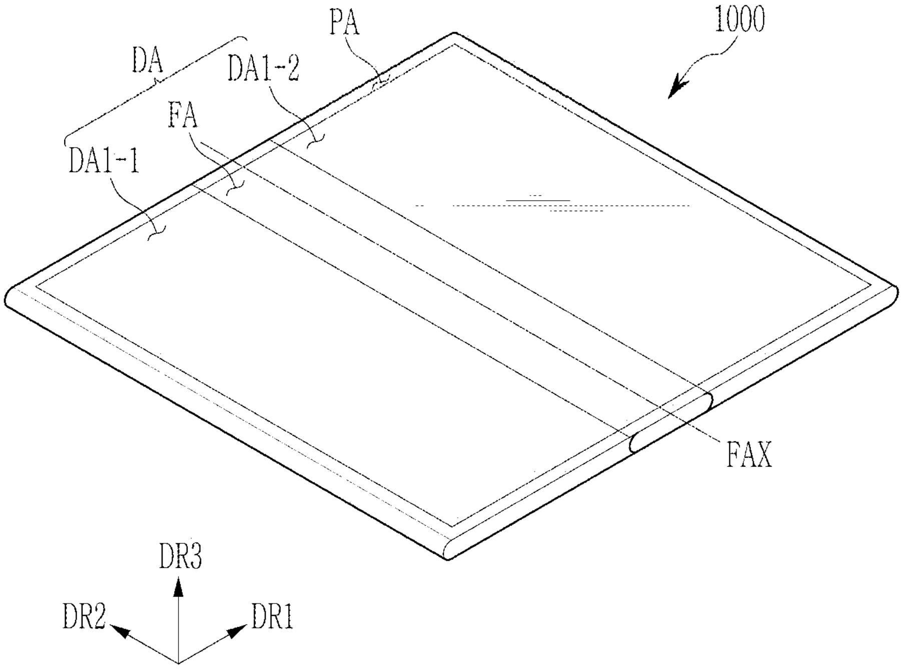
FIG. 1 schematically illustrates a perspective view of a flexible display device according to an embodiment.

The disclosure will be described more fully hereinafter with reference to the accompanying drawings, in which embodiments are shown. As those skilled in the art would realize, the described embodiments may be modified in various different ways, all without departing from the spirit or scope of the disclosure.

In order to clearly describe the embodiments, parts or portions that are irrelevant to the description may be omitted, and identical or similar constituent elements throughout the specification are denoted by the same reference numerals.

Further, in the drawings, the size and thickness of each element may be arbitrarily illustrated for ease of description, and the disclosure is not necessarily limited to those illustrated in the drawings.

It will be understood that when an element such as a layer, film, region, area, substrate, plate, or constituent element is referred to as being "on" another element, it can be directly on the other element or intervening elements may also be present. In contrast, when an element is referred to as being "directly on" another element, there may be no intervening elements present. Further, in the specification, the word "on" or "above" means positioned on or below the object portion, and does not necessarily mean positioned on the upper side of the object portion based on a gravitational direction.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

Further, throughout the specification, the phrase "in a plan view" means viewing a target portion from the top, and the phrase "in a cross-sectional view" means viewing a cross-section formed by vertically cutting a target portion from the side.

In addition, throughout the specification, "connected" does not only mean when two or more elements are directly connected, but when two or more elements are indirectly connected through other elements, and when they are physically connected or electrically connected, and further, it may be referred to by different names depending on a position or function, and may also be referred to as a case in which respective parts that are substantially integrated are linked to each other.

In addition, throughout the specification, when it is said that an element such as a wire, layer, film, region, area, substrate, plate, or constituent element "is extended (or extends) in a first direction or second direction", this does not mean only a straight shape extending straight in the corresponding direction, but may mean a structure that substantially extends in the first direction or the second direction, is partially bent, has a zigzag structure, or extends while having a curved structure.

In addition, both an electronic device (for example, a mobile phone, a TV, a monitor, a laptop computer, etc.) including a display device, or a display panel described in the specification, and an electronic device including a display device and a display panel manufactured by a manufacturing method described in the specification are included in the scope of the disclosure.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 schematically illustrates a perspective view of a flexible display device according to an embodiment.

A light emitting display device 1000 according to an embodiment may be a flexible display device 1000, and the flexible display device 1000 is a device for displaying a moving image or a still image, and may be used as a display screen of a portable electronic device such as a mobile phone, a smart phone, a tablet personal computer (PC), a mobile communication terminal, an electronic note, an electronic book, a portable multimedia players (PMP), a navigation device, and an ultra mobile PC (UMPC), and may be used as display screens of various products such as a television set, a laptop computer, a monitor, a billboard, or an Internet of Things (IOT) device. The flexible display device 1000 according to an embodiment may be used in a wearable device such as a smart watch, a watch phone, a glasses display, and a head mounted display (HMD). The flexible display device 1000 according to an embodiment may be used as an instrument panel of a vehicle, a center information display (CID) disposed on a center fascia or dashboard of a vehicle, a room mirror display that replaces a side mirror of a vehicle, and a display disposed on the back of a front seat for entertainment for a rear seat of a vehicle.

Referring to FIG. 1, the flexible display device 1000 may display an image toward a third direction DR3 on a display surface parallel to each of a first direction DR1 and a second direction DR2. The display surface on which the image is displayed may correspond to a front surface of the flexible display device 1000, and the image may include a still image as well as a moving image.

In an embodiment, a front (or top) surface and a rear (or bottom) surface of each member may be defined based on a direction in which an image is displayed. The front and rear surfaces may be opposite to each other in the third direction DR3, and a normal direction of each of the front and rear surfaces may be parallel to the third direction DR3. A separation distance in the third direction DR3 between the front and rear surfaces may correspond to a thickness of a display panel DP in the third direction DR3.

The flexible display device 1000 according to an embodiment may detect a user input applied from the outside. The user's input may include various types of external inputs such as a part of the user's body, light, heat, or pressure. In an embodiment, the user's input may be an input by a user's hand applied to the front surface or an input such as a pen such as a stylus used by the user, but the disclosure is not limited thereto. The flexible display device 1000 may sense a user input applied to a side surface or a rear surface of the flexible display device 1000 according to a structure of the flexible display device 1000.

In an embodiment, the flexible display device 1000 may include a display area DA and a peripheral area PA (hereinafter also referred to as a non-display area). The display area DA may be an area in which an image is displayed, and may be an area in which an external input is sensed. The display area DA may be an area in which pixels, which will be described later, are disposed.

Figure 2:
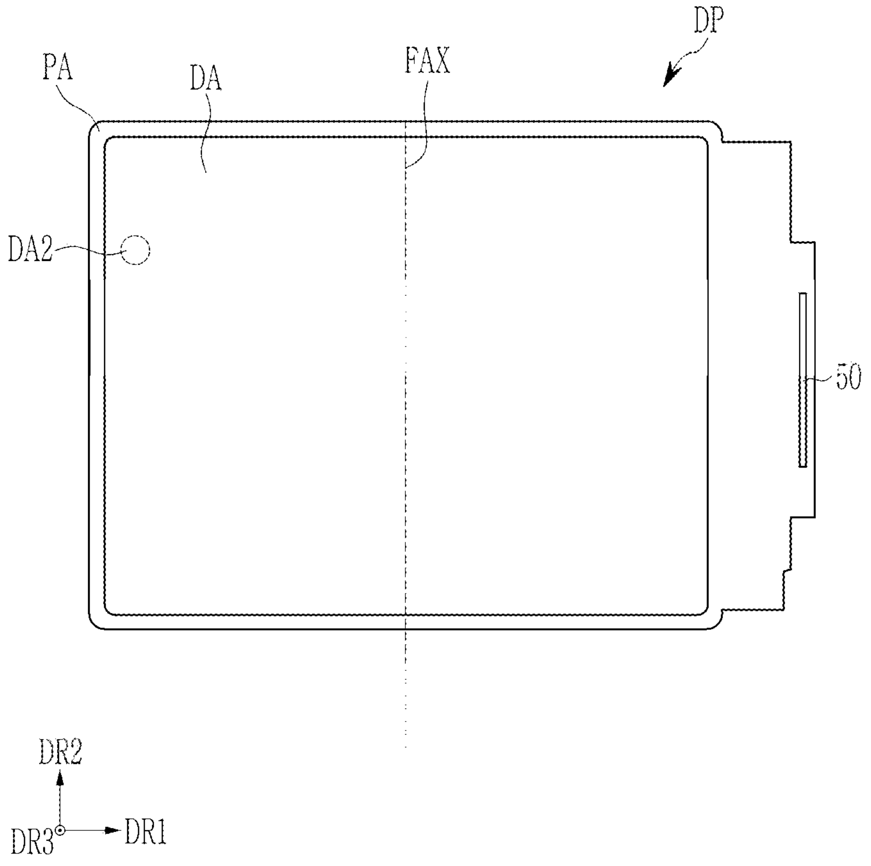
FIG. 2 schematically illustrates a top plan view of a flexible display panel according to another embodiment.

The display area DA may include a first display area DA1 and a second display area (refer to DA2 of FIG. 2).

Multiple light emitting diodes, and multiple pixel circuits that generate and transmit a light emitting current to each of the light emitting diodes may be formed in the first display area DA1. Here, one light emitting diode and one pixel circuit may be referred to as a pixel. One pixel circuit and one light emitting diode may be formed at a one-to-one ratio in the first display area DA1.

The first display area DA1 may be divided into a (1-1)-th display area DA1-1, a (1-2)-th display area DA1-2, and a folding area FA. The (1-1)-th display area DA1-1 and the (1-2)-th display area DA1-2 may be disposed at the left and right sides, respectively, based on (or at the center) of a folding axis FAX, and the folding area FA may be disposed between the (1-1)-th display area DA1-1 and the (1-2)-th display area DA1-2. In case folded outwardly based on the folding axis FAX, the (1-1)-th display area DA1-1 and the (1-2)-th display area DA1-2 may be disposed at both sides in the third direction DR3, and an image may be displayed in both directions. In case folded inwardly based on the folding axis FAX, the (1-1)-th display area DA1-1 and the (1-2)-th display area DA1-2 may not be viewed from the outside.

In some embodiments, the display area DA may further include the second display area (refer to DA2 of FIG. 2), and this embodiment will be described with reference to FIG. 2.

In FIG. 2, a planar structure of a display panel DP that may be included in a flexible display device 1000 according to another embodiment will be described.

FIG. 2 schematically illustrates a top plan view of a flexible display panel according to another embodiment.

The display panel DP included in the flexible display device 1000 also may have a display area DA positioned on the front surface, and the display area DA may be largely divided into a first display area DA1 (hereinafter also referred to as a main display area) and a second display area DA2 (hereinafter also referred to as a component area).

Multiple light emitting diodes, and multiple pixel circuits that generate and transmit a light emitting current to each of the light emitting diodes are formed in the first display area DA1. Here, one light emitting diode and one pixel circuit may be referred to as a pixel. One pixel circuit and one light emitting diode may be formed at a one-to-one ratio in the first display area DA1.

The second display area DA2 may include a light transmitting area, and may additionally include a pixel for displaying an image. The second display area DA2 may at least partially overlap an optical element such as a camera or an optical sensor. FIG. 2 shows that the second display area DA2 is provided in a circle shape at a left side of the flexible display device 1000, but the disclosure is not limited thereto. The second display area DA2 may be provided in various numbers and shapes according to the number and shape of the optical elements.

The flexible display device 1000 may receive an external signal required for the optical element through the second display area DA2, or may provide a signal outputted from the optical element to the outside. In an embodiment, the second display area DA2 is provided to overlap the light transmitting area, so that an area of the peripheral area PA for forming the light transmitting area may be reduced.

In some embodiments, a boundary area may be positioned between the first display area DA1 and the second display area DA2.

The peripheral area PA may be further positioned outside the display area DA. In an embodiment of FIG. 2, since the second display area DA2 is surrounded by the first display area DA1, the area of the display area DA may not decrease due to the second display area DA2, and the area of the peripheral area PA may not increase.

Referring to FIG. 1 and FIG. 2, in an embodiment, the flexible display device 1000 may be a foldable flexible display device. The flexible display device 1000 may be folded outwardly or inwardly based on the folding axis FAX. In case that the flexible display device 1000 is folded outwardly based on the folding axis FAX, display surfaces thereof may each be positioned at outer sides in the third direction DR3, so that images may be displayed in both directions. In case that the light emitting display device 1000 is folded inwardly based on the folding axis FAX, the display surfaces thereof may not be viewed from the outside.

In FIG. 2, the peripheral area PA is also illustrated outside the display area DA, and a driver 50 is also illustrated in the peripheral area PA. The peripheral area PA may be divided into the driver 50, a connection wire, and a bending area. In some embodiments, a portion of the display panel DP in which the driver 50 is positioned may be folded to the rear surface to position the driver 50 behind the display area DA, and the flexible display device 1000 may be completed.

In an embodiment of FIG. 2, the driver 50 is illustrated as being positioned in the peripheral area PA at the first direction DR1 side of the display area DA, and the driver 50 extends in a direction parallel to the folding axis FAX, but the position of the driver 50 may be variously changed.

A structure in which the flexible display device 1000 is folded based on the folding axis FAX will be described with reference to FIG. 3.

Figure 3:
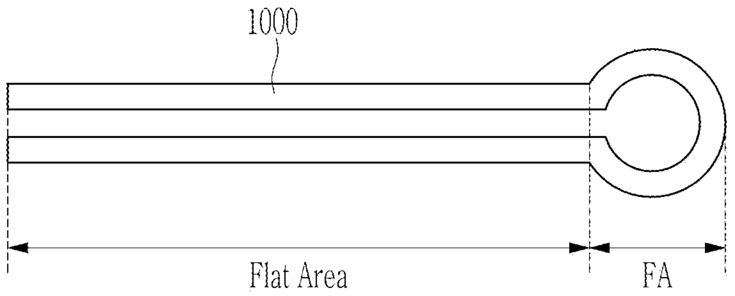
FIG. 3 schematically illustrates a cross-sectional view in which a flexible display device is folded.

FIG. 3 schematically illustrates a cross-sectional view in which a flexible display device is folded.

The flexible display device 1000 may be divided into a folding area FA, and a flat area (Flat Area) positioned at both sides thereof and having a flat structure. Here, the flat area (Flat Area) may correspond to the (1-1)-th display area DA1-1 and the (1-2)-th display area DA1-2 of FIG. 1.

Particularly, referring to FIG. 3, in case that the folding area FA of the flexible display device 1000 is folded, a cross-sectional shape may have a dumbbell shape. In an embodiment, in the folding area FA, a first portion adjacent to the folding axis FAX may be formed to have a large curvature, a second portion a little far from the folding axis FAX may be formed to be flat or bent slightly, and an end of the folding area FA may be formed to be folded in a dumbbell shape by being formed to have a large curvature.

However, the cross-sectional shape in case folded may not be the dumbbell shape of FIG. 3.

As described above, in case that the display device is a flexible display device, a pixel positioned in the folding area FA may be stressed due to folding and unfolding operations, and cracks may occur in some pixels, so that some transistors of the pixel may not operate. Such cracks may occur in case that the upper surface of the display device is touched with a hand or a stylus. Hereinafter, a circuit structure of a pixel further including a blocking part that does not transmit an output current of a driving transistor to a light emitting diode in case that some transistors in the pixel do not operate will be described with reference to FIG. 4.

Figure 4:
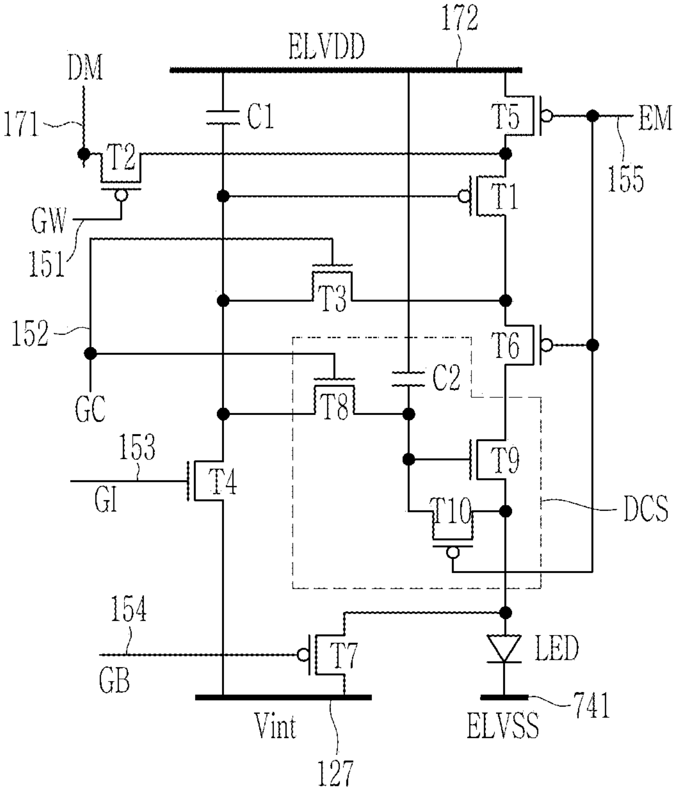
FIG. 4 schematically illustrates an equivalent circuit of a pixel of an organic light emitting display device according to an embodiment.

FIG. 4 schematically illustrates an equivalent circuit of a pixel of an organic light emitting display device according to an embodiment.

Referring to FIG. 4, the pixel of the organic light emitting display device may include multiple transistors T1, T2, T3, T4, T5, T6, T7, T8, T9, and T10, a storage capacitor C1 (hereinafter referred to as a first capacitor), a second capacitor C2, and a light emitting diode LED, which are connected to several signal lines 127, 151, 152, 153, 154, 155, 171, 172, and 741. Here, the transistors and the capacitors excluding the light emitting diode LED may form a pixel circuit part. A portion of the pixel circuit including transistors T1, T2, T3, T4, T5, T6, and T7 and the storage capacitor C1 may configure a first pixel circuit part (hereinafter also referred to as a light emitting diode driver), and a portion thereof including the remaining transistors T8, T9, and T10 and the second capacitor C2 may configure a second pixel circuit part DCS (hereinafter also referred to as a blocking part). In some embodiments, an additional transistor or an additional capacitor may be further included.

In the organic light emitting display device according to an embodiment, one pixel may be configured with the circuit diagram shown in FIG. 4, and multiple pixels may be arranged in various ways such as a matrix.

Some transistors T3, T4, T8, and T9 of the multiple transistors T1, T2, T3, T4, T5, T6, T7, T8, T9, and T10 included in the pixel may have an n-type transistor characteristic by forming a semiconductor layer with an oxide semiconductor, and the remaining transistors T1, T2, T5, T6, T7, and T10 may have a p-type transistor characteristic by forming a semiconductor layer with a polycrystalline semiconductor. Here, the p-type transistor may be turned on in case that a gate electrode thereof has a low level (negative polarity) voltage, and the n-type transistor thereof may be turned on in case that a gate electrode thereof has a high level (positive polarity) voltage.

The wires 127, 151, 152, 153, 154, 155, 171, 172, and 741 are connected to one pixel. The wires may include an initialization voltage line 127, a first scan line 151, a second scan line 152, an initialization control line 153, a bypass control line 154, a light emitting control line 155, a data line 171, a driving voltage line 172, and a common voltage line 741. The bypass control line 154 in an embodiment may be electrically connected to the first scan line 151 of a previous pixel.

The first scan line 151 may be connected to a gate driver (not shown) to transmit a first scan signal GW to the second transistor T2. The second scan line 152 may be connected to the gate driver to transmit a second scan signal GC to the third transistor T3 and the eighth transistor T8. The initialization control line 153 may be connected to the gate driver to transmit an initialization control signal GI to the fourth transistor T4. The bypass control line 154 may be connected to the gate driver to transmit a bypass signal GB to the seventh transistor T7. The light emitting control line 155 may be connected to a light emitting controller (not shown), and may transmit a light emitting control signal EM that controls a light emitting time of the light emitting diode LED to the fifth transistor T5, the sixth transistor T6, and the tenth transistor T10.

The data line 171 may be a wire that transmits a data voltage DM generated by a data driver (not shown), and luminance emitted by the light emitting diode LED may be changed according to the data voltage DM applied to the pixel.

The driving voltage line 172 may apply a driving voltage ELVDD, the initialization voltage line 127 may transmit an initialization voltage Vint for initializing a gate electrode of the driving transistor T1 and an anode electrode of the light emitting diode LED, and the common voltage line 741 may apply a second driving voltage ELVSS to a cathode electrode of the light emitting diode LED. Voltages applied to the driving voltage line 172, the initialization voltage line 127, and the common voltage line 741 may be constant.

Hereinafter, the transistors T1, T2, T3, T4, T5, T6, T7, T8, T9, and T10 and the capacitors C1 and C2 will be described in detail.

A driving transistor T1 (also referred to as a first transistor) may be a p-type transistor, and have a silicon semiconductor (hereinafter, also referred to as a polycrystalline semiconductor or a first semiconductor) as a semiconductor layer. It may be a transistor that adjusts an amount of a light emitting current outputted to the anode of the light emitting diode LED according to a voltage (that is, a voltage stored in the storage capacitor C1 (hereafter referred to as a 'first capacitor')) of a gate electrode of the driving transistor T1. For this purpose, a first electrode of the driving transistor T1 may be disposed to receive the driving voltage ELVDD, and may be connected to the driving voltage line 172 via the fifth transistor T5. The first electrode of the driving transistor T1 may be connected to a second electrode of the second transistor T2 to receive the data voltage DM. A second electrode of the driving transistor T1 may output the light emitting current to the light emitting diode LED, and may be connected to the anode of the light emitting diode LED via a sixth transistor T6 (hereinafter referred to as an output control transistor) and a ninth transistor T9 (hereinafter referred to as a 'current blocking transistor'). The second electrode of the driving transistor T1 may also be connected to the third transistor T3 to transmit the data voltage DM applied to the first electrode thereof to the third transistor T3. The gate electrode of the driving transistor T1 may be connected to one electrode (hereinafter referred to as a 'second storage electrode') of the storage capacitor C1. The other electrode (hereinafter referred to as a 'first storage electrode) of the storage capacitor C1 may receive the driving voltage ELVDD. Accordingly, a voltage of the gate electrode of the driving transistor T1 may be changed according to a voltage stored in the storage capacitor C1, and accordingly, a light emitting current outputted from the driving transistor T1 may be changed. The storage capacitor C1 may serve to maintain the voltage of the gate electrode of the driving transistor T1 constant for one frame. The gate electrode of the driving transistor T1 may also be connected to the third transistor T3 so that the data voltage DM applied to the first electrode of the driving transistor T1 passes through the third transistor T3 to be transmitted to the gate electrode of the driving transistor T1. The gate electrode of the driving transistor T1 may also be connected to the fourth transistor T4 to be initialized by receiving the first initialization voltage Vint. The gate electrode of the driving transistor T1 may also be connected to a first electrode of the eighth transistor T8 (hereinafter also referred to as a 'gate voltage transmitting transistor') so that the voltage of the driving gate electrode, that is, the voltage of the second storage electrode of the storage capacitor C1 is transmitted to a second electrode of the second capacitor C2, a gate electrode of the ninth transistor T9, and a first electrode of the tenth transistor T10 (hereinafter also referred to as a 'second capacitor charging transistor').

The second transistor T2 may be a p-type transistor, and have a silicon semiconductor as a semiconductor layer. The second transistor T2 may be a transistor that allows the data voltage DM to be received into the pixel. The gate electrode of the second transistor T2 may be connected to the first scan line 151. A first electrode of the second transistor T2 may be connected to the data line 171, and a second electrode of the second transistor T2 may be connected to the first electrode of the driving transistor T1. In case that the second transistor T2 is turned on by a negative voltage of the first scan signal GW transmitted through the first scan line 151, the data voltage DM transmitted through the data line 171 may be transmitted to the first electrode of the driving transistor T1, and finally, the data voltage DM may be transmitted to the gate electrode of the driving transistor T1 to be stored in the storage capacitor C1.

The third transistor T3 may be an n-type transistor, and have an oxide semiconductor (hereinafter, also referred to as a second semiconductor) as a semiconductor layer. The third transistor T3 may electrically connect the second electrode of the driving transistor T1 and the gate electrode of the driving transistor T1. As a result, it may be a transistor that allows the data voltage DM to be compensated by a threshold voltage of the driving transistor T1 and stored in the second storage electrode of the storage capacitor C1. A gate electrode of the third transistor T3 may be connected to the second scan line 152, and a first electrode of the third transistor T3 may be connected to the second electrode of the driving transistor T1. A second electrode of the third transistor T3 may be connected to the second storage electrode of the storage capacitor C1, the gate electrode of the driving transistor T1, a second electrode of the fourth transistor T4, and the first electrode of the eighth transistor T8. The third transistor T3 may be turned on by a positive voltage of a second scan signal GC transmitted through the second scan line 152 to connect the gate electrode of the driving transistor T1 and the second electrode of the driving transistor T1, and to allow a voltage applied to the gate electrode of the driving transistor T1 to be transmitted to the second storage electrode of the storage capacitor C1 to be stored in the storage capacitor C1. The voltage stored in the storage capacitor C1 may be stored in a state in which the voltage of the gate electrode of the driving transistor T1 in case that the driving transistor T1 is turned off is stored and a threshold voltage of the driving transistor T1 is compensated.

The fourth transistor T4 may be an n-type transistor, and have an oxide semiconductor as a semiconductor layer. The fourth transistor T4 may serve to initialize the gate electrode of the driving transistor T1 and the second storage electrode of the storage capacitor C1. A gate electrode of the fourth transistor T4 may be connected to the initialization control line 153, and a first electrode of the fourth transistor T4 may be connected to the initialization voltage line 127. The second electrode of the fourth transistor T4 may be connected to the second electrode of the third transistor T3, the second storage electrode of the storage capacitor C1, the gate electrode of the driving transistor T1, and the first electrode of the eighth transistor T8. The fourth transistor T4 may be turned on by a positive voltage of the initialization control signal GI received through the initialization control line 153, and in this case, it transmits the initialization voltage Vint to the gate electrode of the driving transistor T1 and the second storage electrode of the storage capacitor C1 to initialize them.

The fifth transistor T5 and the sixth transistor T6 may be p-type transistors, and have silicon semiconductors as a semiconductor layer.

The fifth transistor T5 may serve to transmit the driving voltage ELVDD to the driving transistor T1. A gate electrode of the fifth transistor T5 may be connected to the light emission control line 155, a first electrode of the fifth transistor T5 may be connected to the driving voltage line 172, and a second electrode of the fifth transistor T5 may be connected to the first electrode of the driving transistor T1.

The sixth transistor T6 may serve to transmit an emission current outputted from the driving transistor T1 to the ninth transistor T9. A gate electrode of the sixth transistor T6 may be connected to the light emission control line 155, a first electrode of the sixth transistor T6 may be connected to the second electrode of the driving transistor T1, and a second electrode of the sixth transistor T6 may be connected to a first electrode of the ninth transistor T9.

The seventh transistor T7 may be formed as a p-type transistor or an n-type transistor, and may have a silicon semiconductor or an oxide semiconductor as a semiconductor layer, and in FIG. 4, the seventh transistor T7 is formed as a p-type transistor. The seventh transistor T7 may serve to initialize the anode of the light emitting diode LED. A gate electrode of the seventh transistor T7 may be connected to the bypass control line 154, and a first electrode of the seventh transistor T7 may be connected to the anode of the light emitting diode LED and the first electrode of the tenth transistor T10, and a second electrode of the seventh transistor T7 may be connected to the initialization voltage line 127. In case that the seventh transistor T7 is turned on by a negative voltage of the bypass signal GB applied to the bypass control line 154, the initialization voltage Vint may be applied to the anode of the light emitting diode LED to initialize it. The gate electrode of the seventh transistor T7 may be connected to the first scan line 151 of the previous pixel. In some embodiments, the initialization voltage applied to the seventh transistor T7 and the initialization voltage applied to the fourth transistor T4 may have different voltage levels.

The first storage electrode of the storage capacitor C1 may be connected to the driving voltage line 172, and the second storage electrode thereof may be connected to the gate electrode of the driving transistor T1, the second electrode of the third transistor T3, the second electrode of the fourth transistor T4, and the first electrode of the eighth transistor T8. Accordingly, the second storage electrode thereof may have the same voltage as the gate electrode of the driving transistor T1, and it may receive the data voltage DM through the second electrode of the third transistor T3 or receive the initial voltage Vint through the second electrode of the fourth transistor T4. The voltage of the second storage electrode of the storage capacitor C1 may be the same as the voltage of the second electrode of the second capacitor C2 and the gate electrode voltage of the ninth transistor T9, by the eighth transistor T8.

In the above, the first pixel circuit part (the driving part of the light emitting diode LED) of the pixel circuit part of the pixel has been described. Hereinafter, a structure of the second pixel circuit part DCS (the blocking part) of the pixel circuit part will be described.

The second pixel circuit part DCS may be connected to the gate electrode of the driving transistor T1 and the second storage electrode of the storage capacitor C1 to connect or disconnect the second electrode of the sixth transistor T6 and the anode of the light emitting diode LED according to the voltage of the gate electrode of the driving transistor T1. As a result, the output current of the driving transistor T1 may be transmitted to the light emitting diode LED, or may be blocked.

Specifically, the second pixel circuit part DCS may include transistors T8, T9, and T10 and the second capacitor C2.

Figure 10:
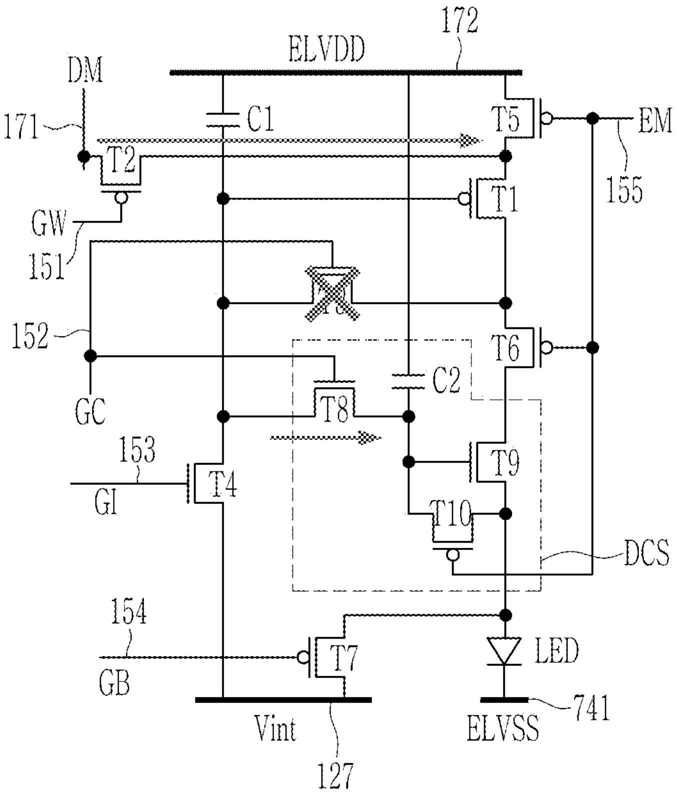
FIG. 10 to FIG. 12 schematically illustrate a case in which a crack occurs in a second transistor or a third transistor.
Figure 11:
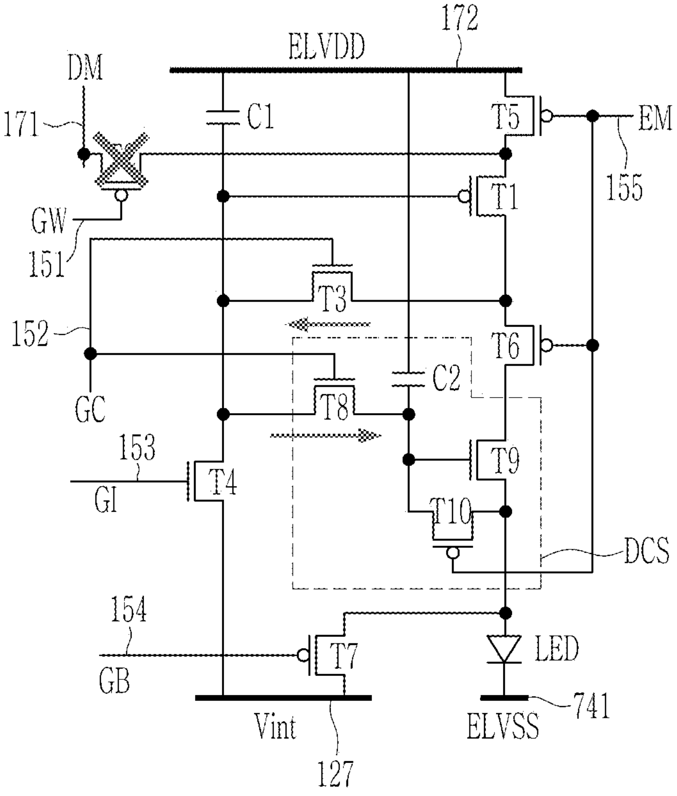

The eighth transistor T8 may be an n-type transistor, and may have an oxide semiconductor as a semiconductor layer. The eighth transistor T8 may serve to electrically connect the second pixel circuit part DCS to the gate electrode of the driving transistor T1 and the second storage electrode of the storage capacitor C1. Specifically, the eighth transistor T8 may serve to electrically connect the gate electrode of the driving transistor T1 and the second storage electrode of the storage capacitor C1 to the gate electrode of the ninth transistor T9, the second electrode of the tenth transistor T10, and the second electrode of the second capacitor C2. As a result, the voltage of the gate electrode of the driving transistor T1 may be transmitted to and stored in the second electrode of the second capacitor C2 through the eighth transistor T8, and may also be transmitted to the gate electrode of the ninth transistor T9. A gate electrode of the eighth transistor T8 may be connected to the second scan line 152, and the first electrode of the eighth transistor T8 may be connected to the gate electrode of the driving transistor T1, the second storage electrode of the storage capacitor C1, and the second electrode of the fourth transistor T4. A second electrode of the eighth transistor T8 may be connected to the second electrode of the second capacitor C2, the gate electrode of the ninth transistor T9, and the second electrode of the tenth transistor T10. The eighth transistor T8 may be turned on together with the third transistor T3 by the positive voltage of the second scan signal GC received through the second scan line 152, so that the voltage of the second storage electrode of the storage capacitor C1 may be transmitted to and stored in the second electrode of the second capacitor C2 and also transmitted to the gate electrode of the ninth transistor T9 and the second electrode of the tenth transistor T10. As a result, a voltage for which the threshold voltage value of the driving transistor T1 stored in the second storage electrode of the storage capacitor C1 is compensated may also be transmitted to and stored in the second electrode of the second capacitor C2. In case that a crack occurs in the third transistor T3 or the second transistor T2 as shown in FIG. 10 and FIG. 11, the initialization voltage Vint stored in the second storage electrode of the storage capacitor C1 may also be transmitted to and stored in the second electrode of the second capacitor C2.

Figure 7:
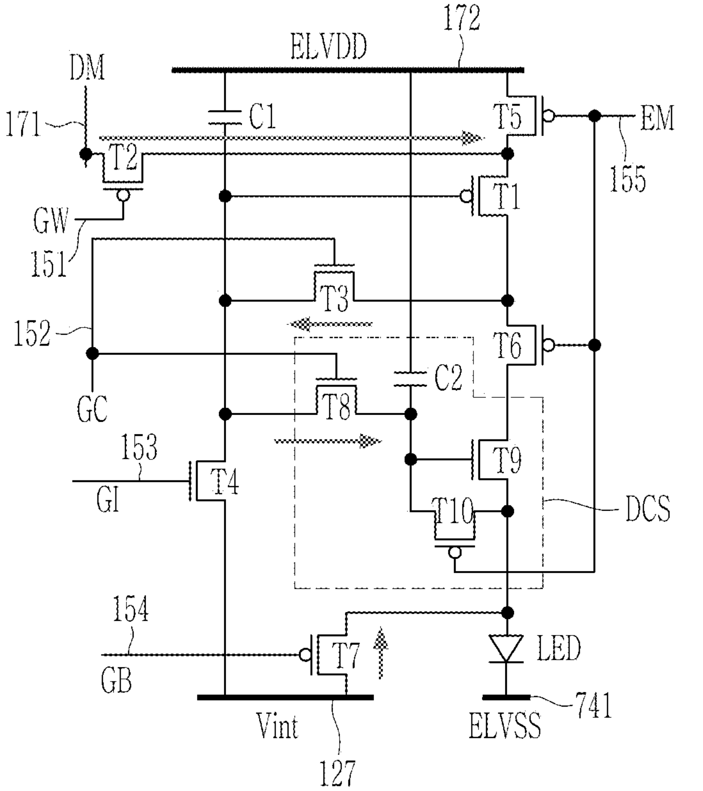

The ninth transistor T9 may be an n-type transistor, and may have an oxide semiconductor as a semiconductor layer. For example, the driving transistor T1 and the ninth transistor T9 may be formed as different types of transistors. The ninth transistor T9 may serve to electrically connect or disconnect the second electrode of the sixth transistor T6 and the anode of the light emitting diode LED according to the voltage stored in the second capacitor C2 (that is, the voltage of the gate electrode of the ninth transistor T9). For example, in case that the voltage stored in the second capacitor C2 is the initialization voltage Vint, the ninth transistor T9 may be turned off so that the second electrode of the sixth transistor T6 and the anode of the light emitting diode LED may be electrically separated. The gate electrode of the ninth transistor T9 and the second electrode of the second capacitor C2 and the gate electrode of the driving transistor T1 and the second storage electrode of the storage capacitor C1 may be connected to each other through the eighth transistor T8, so that they may have the same voltage. Accordingly, in case that the voltage of the gate electrode of the driving transistor T1 is maintained at the initializing voltage Vint, the ninth transistor T9 may be turned off during the light emitting period so that the light emitting current outputted from the driving transistor T1 may not be transmitted to the anode of the light emitting diode LED. In case that the voltage stored in the second capacitor C2 is not the initialization voltage Vint, the ninth transistor T9 may be turned on so that the second electrode of the sixth transistor T6 and the anode of the light emitting diode LED may be electrically connected. Since the gate electrode of the ninth transistor T9 and the second electrode of the second capacitor C2 and the gate electrode of the driving transistor T1 and the second storage electrode of the storage capacitor C1 are connected to each other through the eighth transistor T8 so that they may have the same voltage, in case that the voltage of the gate electrode of the driving transistor T1 in the writing and compensating period is the threshold voltage compensating data voltage for which the data voltage DM is compensated as shown in FIGS. 4 and 7 to be described later, the ninth transistor T9 may be turned on during the light emitting period so that the second electrode of the sixth transistor T6 and the anode of the light emitting diode LED may be electrically connected through the ninth transistor T9. The gate electrode of the ninth transistor T9 may be connected to the second electrode of the eighth transistor T8, the second electrode of the tenth transistor T10, and the second electrode of the second capacitor C2, and the first electrode of the ninth transistor T9 may be connected to the second electrode of the sixth transistor T6. A second electrode of the ninth transistor T9 may be connected to the anode of a light emitting diode LED, the first electrode of the tenth transistor T10, and the second electrode of the seventh transistor T7. The ninth transistor T9 may electrically connect or disconnect the second electrode of the sixth transistor T6 and the anode of the light emitting diode LED according to the voltage of the gate electrode of the ninth transistor T9.

The tenth transistor T10 may be a p-type transistor, and may have a silicon semiconductor as a semiconductor layer. The tenth transistor T10 may serve to transmit the driving voltage ELVDD transmitted to the second electrode of the ninth transistor T9 to the gate electrode of the ninth transistor T9 and the second electrode of the second capacitor C2 in the light emitting period to enable the ninth transistor T9 to be completely turned on. For example, even if the voltage stored in the second capacitor C2 is a voltage that makes it difficult to completely turn on the ninth transistor T9, the tenth transistor T10 may be turned on during the light emitting period to transmit the driving voltage ELVDD to the second electrode of the second capacitor C2 to completely turn on the ninth transistor T9. That is, the tenth transistor T10 may change the voltage of the second electrode of the second capacitor C2 to the driving voltage ELVDD in case that the voltage of the second electrode of the second capacitor C2 is the threshold voltage compensating data voltage in the light emitting period. A gate electrode of the tenth transistor T10 may be connected to the light emitting control line 155; the first electrode of the tenth transistor T10 may be connected to the second electrode of the ninth transistor T9, the anode of the light emitting diode LED, and the second electrode of the seventh transistor T7; and the second electrode of the tenth transistor T10 may be connected to the second electrode of the second capacitor C2, the gate electrode of the ninth transistor T9, and the second electrode of the eighth transistor T8.

A first electrode of the second capacitor C2 may be connected to the driving voltage line 172, and the second electrode thereof may be connected to the second electrode of the eighth transistor T8, the gate electrode of the ninth transistor T9, and the second electrode of the tenth transistor T10. As a result, the second electrode of the second capacitor C2 may have the same voltage as the voltage of the gate electrode of the ninth transistor T9, and receive the voltage of the second electrode of the storage capacitor C1 through the second electrode of the eighth transistor T8 or receive the driving voltage ELVDD through the second electrode of the tenth transistor T10.

The circuit structure of the second pixel circuit part DCS shown in FIG. 4 is an example, and may further include an additional capacitor or an additional transistor. In some embodiments, the eighth transistor T8 and tenth transistor T10 may not be included except for the second capacitor C2 or the ninth transistor T9 among multiple transistors T8, T9, and T10. The gate electrode of the ninth transistor T9 may be connected to a separate signal line or a separate electrode unlike in FIG. 4.

In the above, the structure of the pixel circuit part has been described.

The pixel may include the light emitting diode LED in addition to the pixel circuit part, and the anode of the light emitting diode LED may be connected to the second electrode of the seventh transistor T7, the second electrode of the ninth transistor T9, and the first electrode of the tenth transistor T10, and the cathode thereof may be connected to the common voltage line 741 that transmits the second driving voltage ELVSS.

In the above, it has been described that one pixel includes ten transistors T1 to T10, two capacitors C1 and C2, but the disclosure is not limited thereto, and in some embodiments, transistors or capacitors may be added or some of them removed. In the above-described embodiment, the third transistor T3, the fourth transistor T4, the eighth transistor T8, and the ninth transistor T9 are formed as n-type transistors, but only one of them may be formed as an n-type transistor, or another of them (for example, the seventh transistor T7) may be formed as an n-type transistor.

As described above, the pixel of the light emitting display device may include two types of semiconductors positioned on different layers, and the two types of semiconductors may be a polycrystalline semiconductor (also referred to as a first semiconductor) and an oxide semiconductor (also referred to as a second semiconductor), respectively. Each may be included in a transistor, and hereinafter, a transistor including the polycrystalline semiconductor is referred to as a polycrystalline transistor, and a transistor including the oxide semiconductor is referred to as an oxide transistor. As described above, one pixel may include a polycrystalline transistor and an oxide transistor, and the driving transistor T1 that provides a driving current to the light emitting diode LED may be formed as a polycrystalline transistor. All other transistors excluding the driving transistor T1 are also referred to as switching transistors, and the switching transistors may be divided into a polycrystalline switching transistor and an oxide switching transistor. Each transistor may further include an overlapping electrode overlapping a semiconductor layer, and the overlapping electrode may be applied with a voltage (for example, the driving voltage ELVDD) or may be connected to one terminal within the pixel. The overlapping electrode may serve to change channel characteristics of the transistor or block light or an electric field being introduced into the channel.

An operation of one pixel of a flexible display device according to an embodiment will be described with reference to FIG. 5 to FIG. 9 together with FIG. 4.

Figure 5:
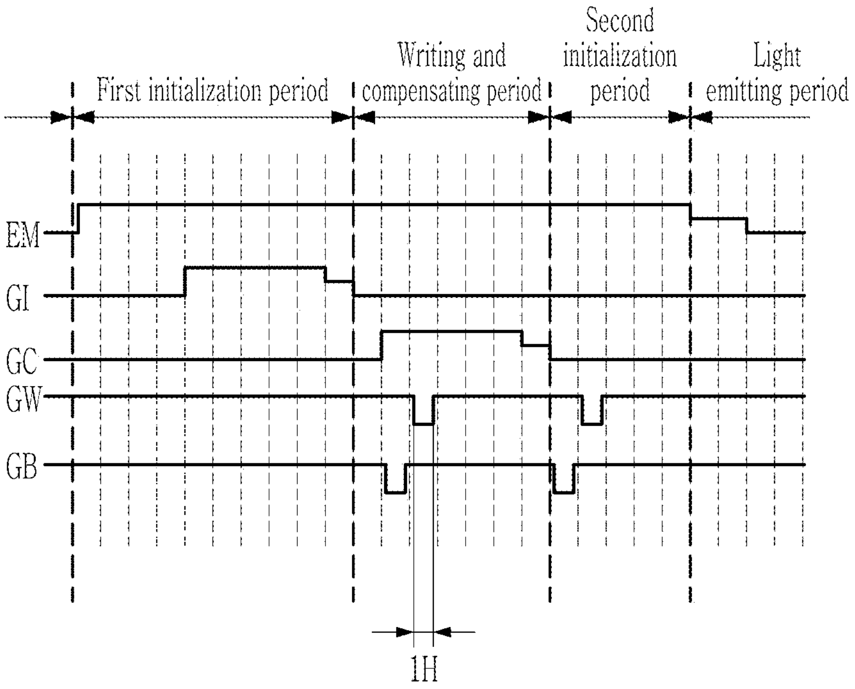
FIG. 5 schematically illustrates a timing diagram of a signal applied to a pixel of the organic light emitting display device according to an embodiment of FIG. 4.

FIG. 5 schematically illustrates a timing diagram of a signal applied to a pixel of the organic light emitting display device according to an embodiment of FIG. 4, and FIG. 6 to FIG. 9 schematically illustrate operations of the pixel of FIG. 4 in respective periods.

Figure 6:
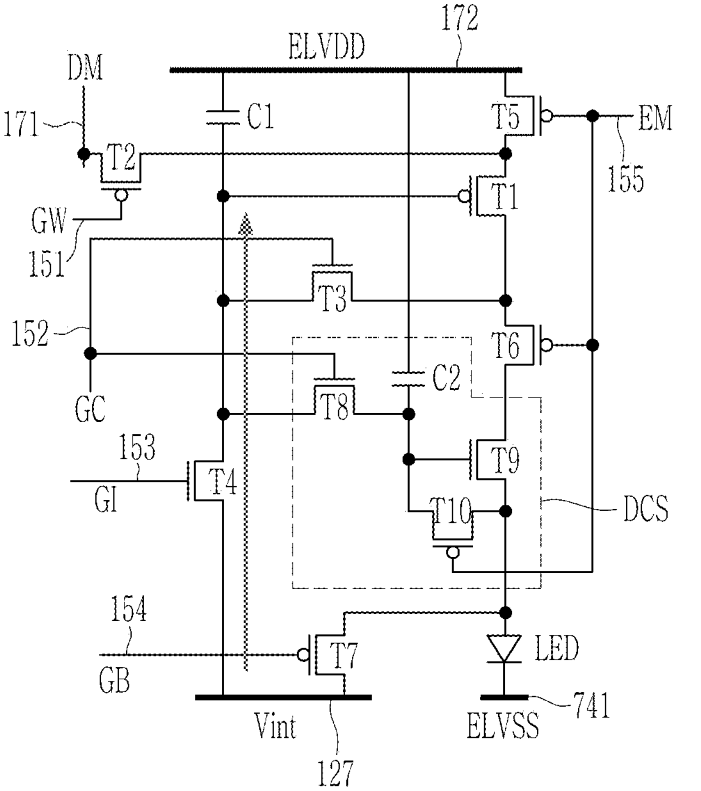
FIG. 6 to FIG. 9 schematically illustrate operations of the pixel of FIG. 4 in respective periods.
Figure 8:
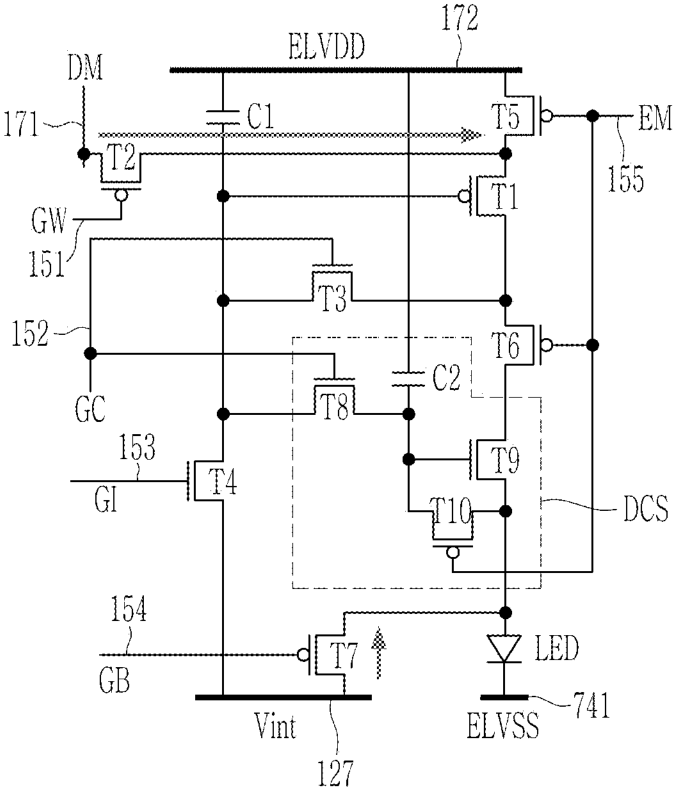
Figure 9:
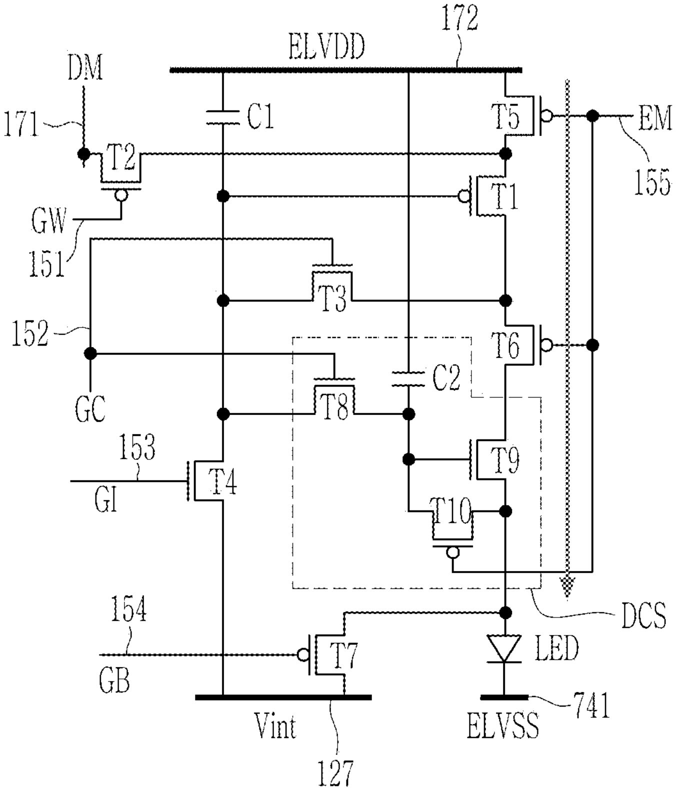

FIG. 6 schematically illustrates a first initialization period, FIG. 7 schematically illustrates a writing and compensating period, FIG. 8 schematically illustrates a second initialization period, and FIG. 9 schematically illustrates a light emitting period.

Hereinafter, the first initialization period will be first described.

The first initialization period may include a period to which a high level initialization control signal GI may be applied, and may be a period in which the fourth transistor T4 is turned on by the high-level initialization control signal GI. Referring to FIG. 6, in the first initialization period, the initialization voltage Vint may be applied to the gate electrode of driving transistor T1 and the second storage electrode of storage capacitor C1 through fourth transistor T4, and the initialization voltage Vint may be stored in the second storage electrode of the storage capacitor C1. The initialization voltage Vint may turn on the driving transistor T1 with a low level voltage, so that the driving transistor T1 is changed to a turned-on state through the first initialization period. A high level voltage may be applied to the first scan signal GW, the light emitting control signal EM, and the bypass signal GB, and a low level voltage may be applied to the second scan signal GC, and a transistor receiving these signals may be maintained at a turned-off state.

In case that the initialization control signal GI is changed to a low level voltage, the first initialization period may be ended, and the writing and compensating period may be entered.

A low level initialization control signal GI and a high level light emitting control signal EM may be applied in the writing and compensating period, and the writing and compensating period may include periods in which a high level second scan signal GC, a low level first scan signal GW, and a low lever bypass signal GB are applied. Referring to FIG. 5, in the writing and compensating period, the second scan signal GC may first be changed to a high level voltage, and the first scan signal GW may be changed to a low level voltage to be maintained for 1H. After that, the writing and compensating period may end as the second scan signal GC is changed to a low level voltage. The bypass signal GB may be changed to a low level voltage ahead of the first scan signal GW by 1H and may be maintained for 1H. However, in some embodiments, the timing at which the bypass signal GB is changed to the low level voltage may be varied, and the period during which the bypass signal GB is maintained at the low level voltage may be variously changed.

Referring to FIG. 7, the third transistor T3 and eighth transistor T8 may be turned on by the high level second scan signal GC. As a result, the first electrode of the driving transistor T1 (the second storage electrode of the storage capacitor C1) and the gate electrode thereof may be connected through the third transistor T3, and the first electrode of the driving transistor T1 and the second storage electrode of the storage capacitor C1 are connected to the gate electrode of the ninth transistor T9, the second electrode of the tenth transistor T10, and the second electrode of the second capacitor C2 through the eighth transistor T8. In the first initialization period, since the initialization voltage Vint is stored in the second storage electrode of the storage capacitor C1, the initialization voltage Vint may also be transmitted to the gate electrode of the ninth transistor T9, the second electrode of the tenth transistor T10, and the second electrode of the second capacitor C2 through the eighth transistor T8, and it is stored in the second electrode of the second capacitor C2.

Thereafter, the second transistor T2 may be turned on by the low level first scan signal GW, and the data voltage DM flowing through the data line 171 may be written into the pixel. The data voltage DM may be transmitted to the first electrode of the driving transistor T1 through the second transistor T2. In the first initialization period, since the driving transistor T1 is turned on by the initialization voltage Vint stored in the second storage electrode of the storage capacitor C1, the data voltage DM transmitted to the first electrode of the driving transistor T1 may be transmitted to the second electrode of the driving transistor T2, and pass through the turned-on third transistor T3 to be transmitted to the second storage electrode of the storage capacitor C1 (the gate electrode of the driving transistor T1). The data voltage DM may be transmitted to the second electrode of the second capacitor C2 by the turned-on eighth transistor T8.

In case that the data voltage DM is applied to the second storage electrode of the storage capacitor C1, in the first initialization period, the voltage of the second storage electrode of the storage capacitor C1 (the gate electrode of the driving transistor T1) having the initialization voltage Vint may gradually increase, and it may be turned off in case that the voltage of the gate electrode of the driving transistor T1 is lower than the data voltage DM by the threshold voltage of the driving transistor T1. Accordingly, the voltage of the second storage electrode of the storage capacitor C1 (the gate electrode of driving transistor T1) that has passed the writing and compensating period may have a voltage value (hereinafter also referred to as a 'threshold voltage compensating data voltage') lower than the data voltage DM by the threshold voltage of the driving transistor T1. Since the threshold voltage compensating data voltage is compensated for a different threshold voltage value for each driving transistor T1, even in case that the driving transistors T1 positioned in each pixel have different threshold voltages due to process dispersion, the output current of the driving transistor T1 may be made constant, so that the non-uniformity between the characteristics of the driving transistor T1 may be improved.

Since the eighth transistor T8 is turned on, the threshold voltage compensating data voltage may also be transmitted to the second electrode of the second capacitor C2. Here, the threshold voltage compensating data voltage may have a voltage value that may be turned on in case that the driving voltage ELVDD is applied to the first electrode of each of the driving transistor T1 and the ninth transistor T9.

In the writing and compensating period, the seventh transistor T7 may be turned on by the low level bypass signal GB, and the initialization voltage Vint may be transmitted to the anode of the light emitting diode LED to initialize the anode of the light emitting diode LED. The initialization voltage Vint may be transmitted to the second electrode of the ninth transistor T9 and the first electrode of the tenth transistor T10.

Thereafter, the writing and compensating period may end as the second scan signal GC is changed to a low level voltage, and the second initialization period may proceed. In some embodiments, the second initialization period may be omitted.

In the second initialization period, a low level initialization control signal GI, a low level second scan signal GC, and a high level light emitting control signal EM may be applied, and the second initialization period includes periods in which a low level first scan signal GW and a low level bypass signal GB are applied. Referring to FIG. 5, in the second initialization period, the bypass signal GB may be changed to a low level voltage ahead of the first scan signal GW by 1H and may be maintained for 1H, and the first scan signal GW may be changed to a low level voltage and may be maintained for 1H. However, in some embodiments, the timing at which the bypass signal GB is changed to the low level voltage may be varied, the period during which the low level voltage is maintained may be variously changed, and the first scan signal GW may not be changed to the low level during the second initialization period.

Referring to FIG. 8, first, the seventh transistor T7 may be turned on by the low level bypass signal GB, and the initialization voltage Vint may be transmitted to the anode of the light emitting diode LED to initialize the anode of the light emitting diode LED. The initialization voltage Vint may be transmitted to the second electrode of the ninth transistor T9 and the first electrode of the tenth transistor T10.

Thereafter, the second transistor T2 may be turned on by the low level first scan signal GW, and the data voltage DM may be transmitted to the first electrode of the driving transistor T1. The threshold voltage compensating data voltage may be stored in the gate electrode of the driving transistor T1 and the second storage electrode of the storage capacitor C1 in the writing and compensating period, and in this case, since the driving transistor T1 is turned on in case that the driving voltage ELVDD is applied to the first electrode of the driving transistor T1, it may not be turned on with the data voltage DM lower than the driving voltage ELVDD. Even in case that the driving transistor T1 is turned on, the third transistor T3 may be turned off, so that the voltages of the gate electrode of the driving transistor T1 and the second storage electrode of the storage capacitor C1 may not be changed. Since the sixth transistor is also turned off, no current may flow through the light emitting diode LED. Therefore, the data voltage DM entering the pixel in the second initialization period may not perform a special operation.

Thereafter, as the light emitting control signal EM supplied from the light emitting control line 155 is changed to a low level voltage, the light emitting period may be entered. Here, the light emitting control signal EM may have a low level voltage during the light emitting period. In the light emitting period, a low level initialization control signal GI, a low level second scan signal GC, a high level first scan signal GW, and a high level bypass signal GB may be applied.

The fifth transistor T5, the sixth transistor T6, and the tenth transistor T10 may be turned on by the low level light emitting control signal EM. As a result, the driving voltage ELVDD may be applied to the first electrode of the driving transistor T1 through the fifth transistor T5, and the second electrode of the driving transistor T1 may be connected to the first electrode of the ninth transistor T9 through the sixth transistor T6. The tenth transistor T10 may be turned on, so that the gate electrode and the second electrode of the ninth transistor T9 may be connected to each other.

The driving transistor T1 may be turned on by the driving voltage ELVDD applied to the first electrode of the driving transistor T1 through the fifth transistor T5, and the output current thereof may be outputted to the second electrode according to the voltage of the gate electrode of the driving transistor T1, that is, the voltage of the second storage electrode of the storage capacitor C1. Since the sixth transistor T6 is also turned on, the output current of the driving transistor T1 and the driving voltage ELVDD may be transmitted to the first electrode of the ninth transistor T9. The ninth transistor T9 may also be turned on by the driving voltage ELVDD applied to the first electrode of the ninth transistor T9, but the ninth transistor T9 may not be completely turned on. The ninth transistor T9 that is not completely turned on may have difficulty in sufficiently transmitting the output current of the driving transistor T1 to the anode of the light emitting diode LED. However, the ninth transistor T9 may be completely turned on by the tenth transistor T10, which will be described as follows.

In case that the ninth transistor T9 is partially turned on, the driving voltage ELVDD may be transmitted to the first electrode of the tenth transistor T10. Since the tenth transistor T10 is turned on by the low level light emitting control signal EM, the driving voltage ELVDD may be applied to the gate electrode of the ninth transistor T9 and the second electrode of the second capacitor C2 through the second electrode of the tenth transistor T10. Since the ninth transistor T9 is an n-type transistor having the opposite characteristic to that of the driving transistor T1, as the voltage of the gate electrode of the ninth transistor T9 increases, the degree to which it is turned on may increase. In case that the driving voltage ELVDD is applied to the gate electrode of the ninth transistor T9, the ninth transistor T9 may be completely turned on.

Accordingly, the fifth transistor T5, the sixth transistor T6, and the ninth transistor T9 may all be turned on so that the current outputted from the driving transistor T1 may be transmitted to the light emitting diode LED and the light emitting diode LED emits light according to the applied current.

The operation description in FIG. 6 to FIG. 9 describes the operation in case that each transistor of the pixel has no problem. However, since the reason for the existence of the second pixel circuit part DCS is to remove bright spot defects in case that some transistors do not operate due to cracks, hereinafter, the operation of the second pixel circuit part DCS in case that some transistors (the second transistor T2 and/or the third transistor T3) of the pixel do not operate due to a crack or the like will be described with reference to FIG. 10 to FIG. 12.

Figure 12:
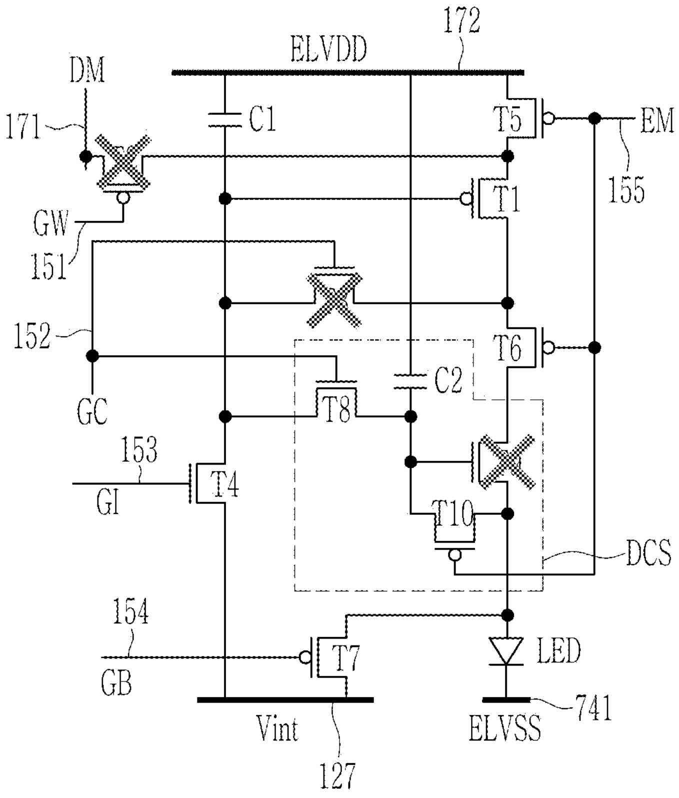

FIG. 10 to FIG. 12 illustrate drawings for explaining a case in which a crack occurs in a second transistor or a third transistor.

The crack may be generated by stress on the transistor due to folding in the flexible display device, touching the front surface of the display device with a stylus or a hand, or an external shock.

First, FIG. 10 schematically illustrates a case in which the third transistor T3 does not operate due to a crack.

FIG. 10 illustrates a case in which, in the writing and compensating period, the low level first scan signal GW is transmitted to the gate electrode of the second transistor T2 and the high level second scan signal GC is transmitted to the gate electrode of each of the third transistor T3 and the eighth transistor T8.

In case that the high level second scan signal GC is applied, the eighth transistor T8 may be turned on, but the third transistor T3, which does not operate due to cracks, may not be turned on. As a result, even if the second transistor T2 is turned on by the low level first scan signal GW so that the data voltage DM is written, since it is not transmitted to the gate electrode of the driving transistor T1 and the second storage electrode of the storage capacitor C1, the voltage stored in the second storage electrode of the storage capacitor C1 may not be changed. Since the initialization voltage Vint is stored in the second storage electrode of the storage capacitor C1 in the first initialization period, the initialization voltage Vint may be maintained at the second storage electrode of the storage capacitor C1 even in the writing and compensating period of the pixel in which the third transistor T3 is defective. Since the eighth transistor T8 is turned on, the second electrode of the second capacitor C2 and the second storage electrode of the storage capacitor C1 may be electrically connected, so the initialization voltage Vint may also be applied to the second electrode of the second capacitor C2. Since the voltage of the second electrode of the second capacitor C2 is the same as the voltage of the gate electrode of the ninth transistor T9 and the ninth transistor T9 is an n-type transistor, in case that the initialization voltage Vint, which is a low-level voltage, is applied to the gate electrode of the ninth transistor T9, the ninth transistor T9 may be maintained at a turned-off state, and the ninth transistor T9 may not be turned on even during the light emitting period.

FIG. 11 schematically illustrates a case in which the second transistor T2 does not operate due to a crack.

FIG. 11 illustrates a case in which, in the writing and compensating period, the low level first scan signal GW is transmitted to the gate electrode of the second transistor T2 and the high level second scan signal GC is transmitted to the gate electrode of each of the third transistor T3 and the eighth transistor T8.

Even if the low level first scan signal GW is applied, the second transistor T2 may not be turned on due to the crack. As a result, the data voltage DM may not be inputted to the driving transistor T1 and, ultimately, may not be transmitted to the gate electrode of the driving transistor T1 and the second storage electrode of the storage capacitor C1, so that the voltage stored in the second storage electrode of the storage capacitor C1 may not be changed. As a result, the voltage (the initialization voltage Vint) of the second storage electrode of the storage capacitor C1 stored in the first initialization period may be maintained as it is. Since the eighth transistor T8 is turned on, the second electrode of the second capacitor C2 also may have the initialization voltage Vint. Due to the initialization voltage Vint of the second electrode of the second capacitor C2, the ninth transistor T9 may be maintained at a turned-off state, and the ninth transistor T9 may not be turned on even during the light emitting period.

In the case of FIG. 10 and FIG. 11 as described above, as shown in FIG. 12, the ninth transistor T9 is not turned on.

For example, in case that the second transistor T2 or the third transistor T3 is not turned on due to a crack, the voltage of the second storage electrode of the storage capacitor C1 (that is, the gate electrode of the driving transistor T1) may be maintained as the initialization voltage Vint, and the second electrode of the second capacitor C2 may also be maintained at the initialization voltage Vint. As a result, as the voltage of the gate electrode of the ninth transistor T9 may be maintained at the initialization voltage Vint, which may be a low level voltage, the ninth transistor T9 may not be turned on.

As described above, in case that the initialization voltage Vint is applied to the second electrode of the second capacitor C2 in the writing and compensating period, an operation in the light emitting period will be described as follows.

In the light emitting period, the low level light emitting control signal EM may be applied to the gate electrode of each of the fifth transistor T5, the sixth transistor T6, and the tenth transistor T10 to be turned on.

In case that the driving voltage ELVDD is applied to the first electrode of the driving transistor T1 through the fifth transistor T5, the driving transistor T1 may be turned on according to the voltage of the gate electrode of the driving transistor T1, that is, the voltage of the second storage electrode of the storage capacitor C1 to output the output current thereof to the second electrode of the driving transistor T1. Since the initialization voltage Vint is applied to the gate electrode of the driving transistor T1, the output current of the driving transistor T1 may have a large current value that enables the light emitting diode LED to display white. Since the sixth transistor T6 is also turned on by the low level light emitting control signal EM, the output current of the driving transistor T1 and the driving voltage ELVDD may be transmitted to the first electrode of the ninth transistor T9. The initialization voltage Vint may be applied to the gate electrode of the ninth transistor T9. Since the ninth transistor T9 is an n-type transistor, it may be turned on only in case that the voltage of the gate electrode of the ninth transistor T9 is higher than the voltage of the first electrode of the ninth transistor T9, however, in relation to the voltage of the ninth transistor T9, the initialization voltage Vint, which is the voltage of the gate electrode thereof, cannot be greater than the driving voltage ELVDD, which is the voltage of the first electrode of the ninth transistor T9, so that the ninth transistor T9 may be maintained at a turned-off state. Accordingly, the output current of the driving transistor T1 may not pass through the ninth transistor T9 and may not be transmitted to the light emitting diode LED. As a result, the light emitting diode LED may not emit light to display black.

As described above, in case that the second transistor T2 and/or the third transistor T3 does not operate due to a crack, the second pixel circuit part DCS may allow the initialization voltage Vint, which is the voltage of the second storage electrode of the storage capacitor C1, to be transmitted to the second electrode of the second capacitor C2 and the gate electrode of the ninth transistor T9 as it is so that the ninth transistor T9 cannot be turned on, so that since the output current of the driving transistor T1 is not transmitted to the light emitting diode LED, a bright spot defect in which the light emitting diode LED displays white does not occur.

In summary, in the second pixel circuit part DCS, in case that the transistor of the pixel normally operates, the output current of the driving transistor T1 may be transmitted to the light emitting diode LED, and in case that the second transistor T2 and/or the third transistor T3 of the pixel do not operate, the output current of the driving transistor T1 is blocked from being transmitted to the light emitting diode LED.

Hereinafter, a voltage-current (V-I) characteristic of the ninth transistor, which is an n-type transistor, will be described in detail with reference to FIG. 13.

Figure 13:
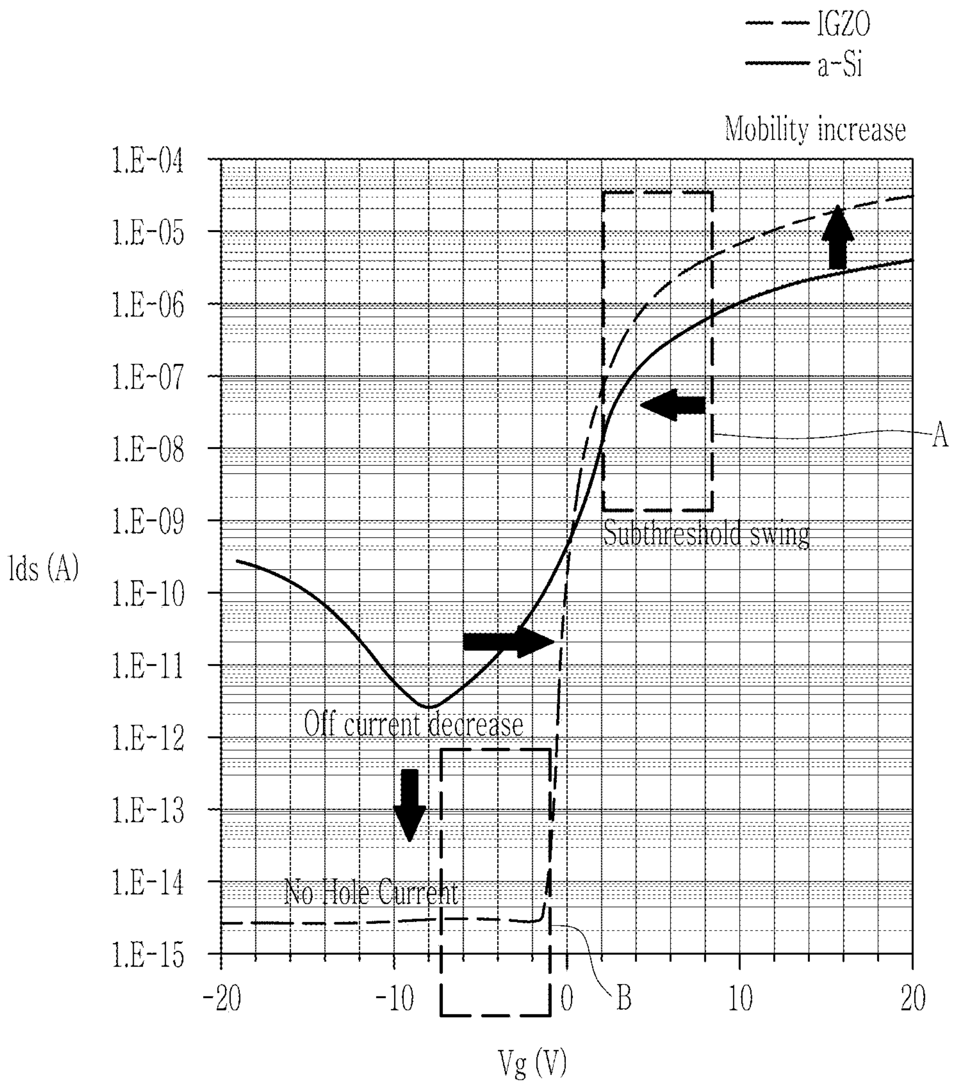
FIG. 13 schematically illustrates a graph of a V-I characteristic of a transistor of a pixel according to an embodiment.

FIG. 13 schematically illustrates a graph of a V-I characteristic of a transistor of a pixel according to an embodiment.

FIG. 13 illustrates Vg-Ids characteristics of a transistor (hereinafter also referred to as amorphous transistor) using an amorphous silicon semiconductor (a-Si) and a transistor (hereinafter also referred to as an oxide transistor) using an oxide semiconductor (IGZO) as a semiconductor of an n-type transistor.

Referring to a portion 'A' of FIG. 13, the amorphous transistor may have lower charge mobility in a turn-on state than that of the oxide transistor. Accordingly, in the case of using the amorphous silicon semiconductor (a-Si) for the ninth transistor T9, compared to the case of using the oxide semiconductor (IGZO), since a degree of transmitting of the current of the driving transistor T1 to the light emitting diode LED in the light emitting period is low, sufficient current may not be transmitted to the light emitting diode LED.

Referring to a portion 'B' of FIG. 13, the amorphous transistor may flow more current than the oxide transistor in a turned-off state. Accordingly, in case that the amorphous silicon semiconductor (a-Si) is used for the ninth transistor T9, the current of the driving transistor T1 may be transmitted to the light emitting diode LED as a leakage current in the light emitting period, which may cause a bright spot defect. In case that the oxide semiconductor (IGZO) is used for the ninth transistor T9 and in case that the second transistor T2 and/or the third transistor T3 does not operate, the current of the driving transistor T1 may not more reliably to the light emitting diode LED in the light emitting period.

Accordingly, referring to FIG. 13, it may be more appropriate to use the oxide semiconductor (for example, IGZO) for the ninth transistor T9, which is an n-type transistor, than to use the amorphous silicon semiconductor (a-Si).

A bright spot defect occurring in case that the second transistor T2 and/or the third transistor T3 may not operate in a pixel of a comparative example will be described below with reference to FIG. 14 and FIG. 15.

Figure 14:
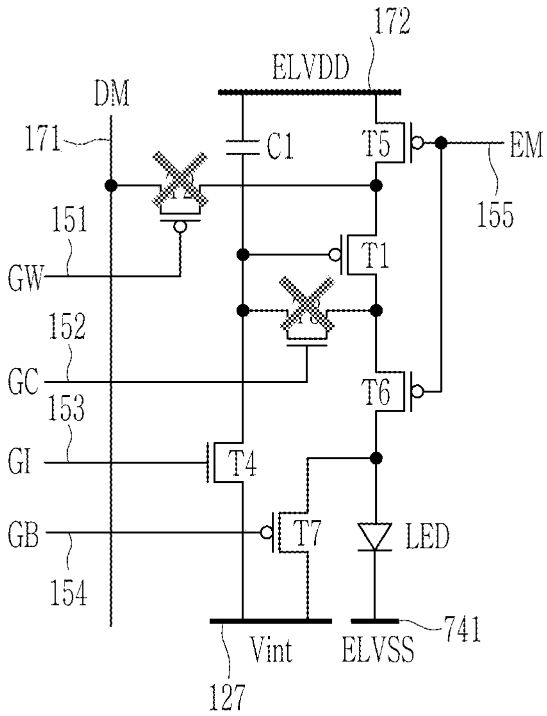
FIG. 14 schematically illustrates an equivalent circuit of a pixel according to a comparative example.
Figure 15:
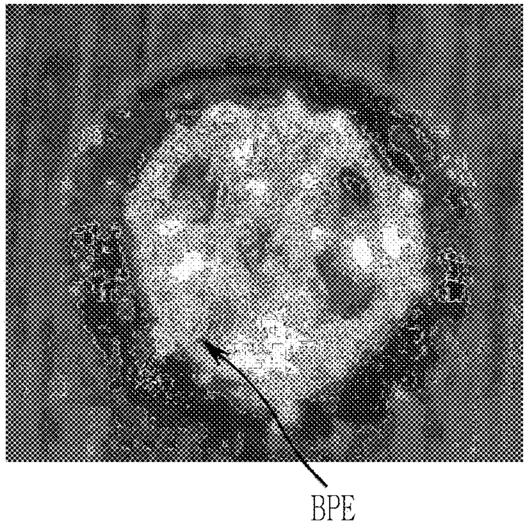
FIG. 15 schematically illustrates a bright spot defect occurring in a display device according to a comparative example.

FIG. 14 schematically illustrates an equivalent circuit of a pixel according to a comparative example, and FIG. 15 schematically illustrates a bright spot defect occurring in a display device according to a comparative example.

Referring to FIG. 14, a pixel circuit part of a pixel of a comparative example includes only a first pixel circuit part (a light emitting diode driver) without including the second pixel circuit part DCS, unlike FIG. 4. As a result, only a light emitting diode LED, multiple transistors T1, T2, T3, T4, T5, T6, and T7, and a storage capacitor C1 are formed in the pixel of the comparative example, and the pixel structure of the comparative example may be the same as the circuit structure of the first pixel circuit part of FIG. 4.

A case in which the second transistor T2 and/or the third transistor T3 does not operate due to a crack in the comparative example of FIG. 14 will be described as follows. A signal applied to FIG. 14 may be the same as the timing diagram of FIG. 5.

In case that the second transistor T2 and/or the third transistor T3 are not turned on, the voltage of the second storage electrode of the storage capacitor C1 is not changed during the writing and compensating period, and the initialization voltage Vint applied and stored during the first initialization period is maintained at it is.

After that, in case that the driving voltage ELVDD is transmitted to the first electrode of the driving transistor T1 in the light emitting period, the driving transistor T1 generates a high output current according to the voltage of the gate electrode of the driving transistor T1, that is, the initialization voltage Vint, and the light emitting diode LED that has received this displays white.

Therefore, the pixel of the comparative example does not display the luminance determined by the data voltage DM, but displays white, resulting in a bright spot defect.

In FIG. 15, a pixel in which a bright spot defect occurs is photographed, and a portion of a bright spot defect BPE is displayed.

In the comparative example as shown in FIG. 14, the bright spot defect that occurs in case that the second transistor T2 and/or the third transistor T3 does not operate is prevented from occurring by including the second pixel circuit part DCS to display black as shown in FIG. 4, so that it is possible to prevent bad pixels from being viewed.

While this disclosure has been described in connection with what is considered to be practical embodiments, it is to be understood that the disclosure is not limited to the disclosed embodiments, but, on the contrary, is intended to cover various modifications and equivalent arrangements included within the spirit and scope of the disclosure.

What is claimed is:

1. A display device comprising:

a light emitting diode including an anode and a cathode;

a driving transistor including a gate electrode, a first electrode, and a second electrode outputting a light emitting current to the anode of the light emitting diode;

a second transistor including a first electrode connected to a data line, a second electrode connected to the first electrode of the driving transistor, and a gate electrode;

a third transistor including a first electrode connected to the second electrode of the driving transistor, a second electrode connected to the gate electrode of the driving transistor, and a gate electrode;

a fourth transistor including a first electrode receiving an initialization voltage, a second electrode connected to the gate electrode of the driving transistor, and a gate electrode; and a current blocking transistor including a gate electrode, a first electrode, and a second electrode connected to the anode of the light emitting diode, wherein the current blocking transistor is a transistor of a different type from the driving transistor, and in case that a voltage of the gate electrode of the driving transistor is maintained at the initialization voltage, the current blocking transistor is turned off during a light emitting period to not transmit the light emitting current outputted by the driving transistor to the anode of the light emitting diode.

2. The display device of claim 1, further comprising a gate voltage transmitting transistor including a first electrode connected to the gate electrode of the driving transistor, a second electrode connected to the gate electrode of the current blocking transistor, and a gate electrode.

3. The display device of claim 2, wherein the gate electrode of the gate voltage transmitting transistor receives the same signal as the gate electrode of the third transistor.

4. The display device of claim 3, further comprising:

a first capacitor including a first storage electrode to which a driving voltage is applied, and a second storage electrode connected to the gate electrode of the driving transistor; and a second capacitor including a first electrode to which the driving voltage is applied, and a second electrode connected to the gate electrode of the current blocking transistor.

5. The display device of claim 4, wherein a data voltage is transmitted to the first storage electrode of the first capacitor through the driving transistor and the third transistor, and is stored as a threshold voltage compensating data voltage in which a threshold voltage of the driving transistor is compensated, and the threshold voltage compensating data voltage is also applied to and stored in the second electrode of the second capacitor through the gate voltage transmitting transistor.

6. The display device of claim 5, wherein in case that the second transistor or the third transistor does not operate, the initialization voltage is stored in the second storage electrode of the first capacitor and the second electrode of the second capacitor.

7. The display device of claim 6, wherein the current blocking transistor is turned off by the initialization voltage stored in the second electrode of the second capacitor, so that a current outputted by the driving transistor is not transmitted to the anode of the light emitting diode.

8. The display device of claim 5, further comprising a second capacitor charging transistor including a first electrode connected to the second electrode of the current blocking transistor, a second electrode connected to the gate electrode of the current blocking transistor, and a gate electrode.

9. The display device of claim 8, wherein in case that a voltage of the second electrode of the second capacitor is the threshold voltage compensating data voltage in the light emitting period, the second capacitor charging transistor changes a voltage of the second electrode of the second capacitor to the driving voltage.

10. The display device of claim 8, further comprising:

a fifth transistor including a first electrode to which the driving voltage is applied, a second electrode connected to the first electrode of the driving transistor, and a gate electrode; and a sixth transistor including a first electrode connected to the second electrode of the driving transistor, a second electrode connected to the first electrode of the current blocking transistor, and a gate electrode.

11. The display device of claim 10, wherein the gate electrode of the fifth transistor, the gate electrode of the sixth transistor, and the gate electrode of the second capacitor charging transistor receive a light emitting control signal having a low level voltage during the light emitting period.

12. The display device of claim 10, further comprising:

a seventh transistor including a first electrode to which the initialization voltage is applied, a second electrode connected to the anode of the light emitting diode, and a gate electrode.

13. The display device of claim 10, wherein the driving transistor, the fifth transistor, the sixth transistor, and the second capacitor charging transistor are p-type transistors, and the third transistor, the gate voltage transmitting transistor, and the current blocking transistor are n-type transistors.

14. The display device of claim 1, wherein the display device is a flexible display device.

15. A display device comprising:

a light emitting diode including an anode and a cathode;

a first pixel circuit part including a driving transistor generating a light emitting current transmitted to the anode of the light emitting diode, the driving transistor including a gate electrode, a first electrode, and a second electrode, and a second transistor transmitting a data voltage to the driving transistor; and a second pixel circuit part connected to the gate electrode of the driving transistor to transmit or block the light emitting current of the driving transistor to the anode of the light emitting diode according to a voltage of the gate electrode of the driving transistor.

16. The display device of claim 15, wherein the second pixel circuit part includes a current blocking transistor including a gate electrode, a first electrode connected to the second electrode of the driving transistor, and a second electrode connected to the anode of the light emitting diode;

the current blocking transistor is a transistor of a different type from the driving transistor; and the current blocking transistor transmits or blocks the light emitting current of the driving transistor to the anode according to a voltage of the gate electrode of the driving transistor.

17. The display device of claim 16, wherein the current blocking transistor, in case that the voltage of the gate electrode of the driving transistor is an initialization voltage, is turned off to not transmit the light emitting current to the anode; and the current blocking transistor, in case that the voltage of the gate electrode of the driving transistor is a threshold voltage compensating data voltage in which a threshold voltage of the driving transistor is compensated from the data voltage, is turned on to transmit the light emitting current to the anode.

18. The display device of claim 17, wherein the second pixel circuit part further includes a gate voltage transmitting transistor including a first electrode connected to the gate electrode of the driving transistor and a second electrode connected to the gate electrode of the current blocking transistor.

19. The display device of claim 18, wherein the second pixel circuit part further includes a second capacitor charging transistor including a first electrode connected to the second electrode of the current blocking transistor and a second electrode connected to the gate electrode of the current blocking transistor.

20. The display device of claim 19, wherein the first pixel circuit part further includes a first capacitor including a first storage electrode to which a driving voltage is applied, and a second storage electrode connected to the gate electrode of the driving transistor; and the second pixel circuit part further includes a second capacitor including a first electrode to which the driving voltage is applied, and a second electrode connected to the gate electrode of the current blocking transistor.

* * * * *